Dec. 19, 1933.   W. T. COMER   1,940,164
APPARATUS FOR AND PROCESS OF FREEZING COMESTIBLES
Filed July 17, 1931
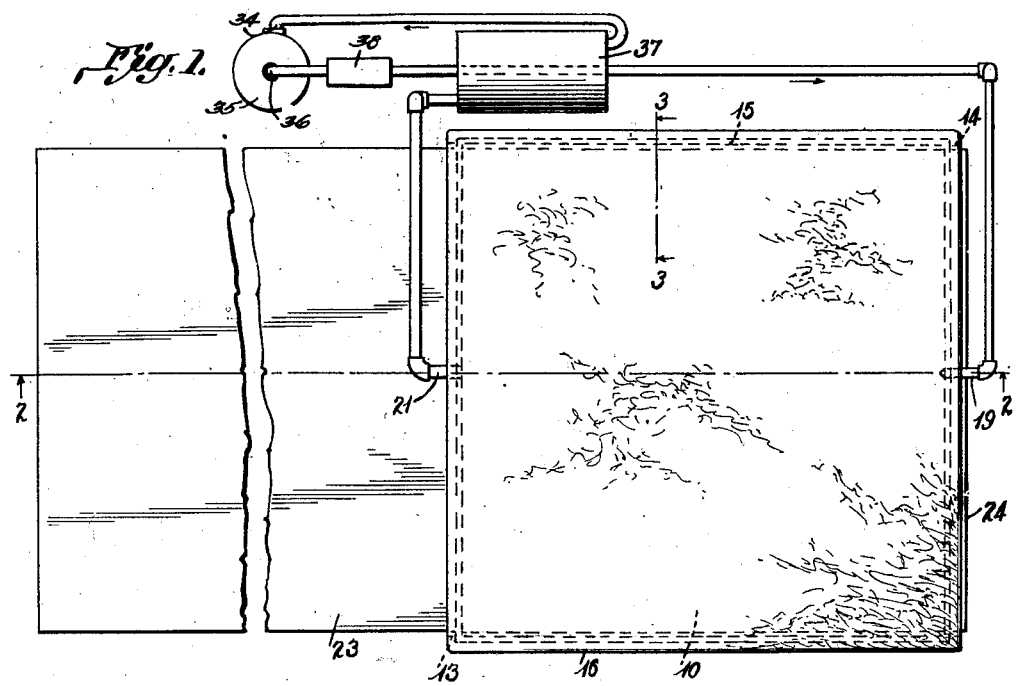
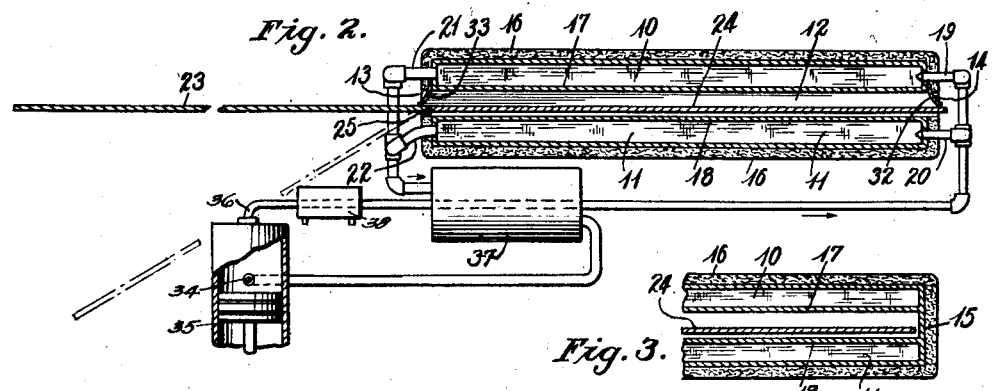
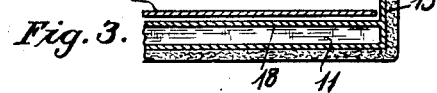
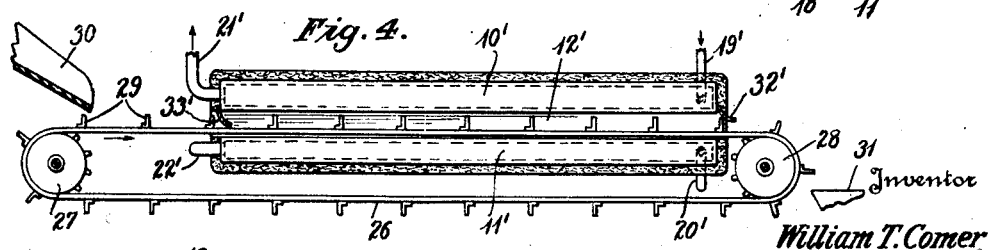
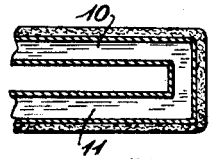

Patented Dec. 19, 1933

1,940,164

UNITED STATES PATENT OFFICE

1,940,164

APPARATUS FOR AND PROCESS OF FREEZING COMESTIBLES

William T. Comer, Atlanta, Ga., assignor to Crystal Carbonic Laboratory, Atlanta, Ga., a corporation of Georgia Application July 17, 1931. Serial No. 551,509

4 Claims. (Cl. 62—91.5)

The invention relates to freezing of comestibles and has as an object the provision of apparatus to freeze material substantially instantaneously, meaning thereby within a period of from one minute to twenty minutes, which may be considered instantaneous as compared with former processes of freezing comestibles.

It is a further object of the invention to provide apparatus for freezing comestibles utilizing solid carbon dioxide as a freezing medium.

It is a further object of the invention to provide apparatus for freezing material wherein the material may be moved into a chamber, frozen, removed therefrom, and other material may be moved into the chamber in the act of removing the frozen material.

Illustrative embodiments of the apparatus are shown in the accompanying drawing wherein:

Fig. 1 is a plan view;

Fig. 2 is a vertical section on line 2—2 of Fig. 1;

Fig. 3 is a detail vertical section on line 3—3 of Fig. 1;

Fig. 4 is a central vertical section corresponding to Fig. 2 but showing a modified form of the device; and Fig. 5 is a detail transverse section of a modification.

It has been the experience of fruit growers and users that fruit when frozen and thawed is spoiled as, after thawing, the fruit is found to be soft and very quickly decays. This is true also of many other comestibles.

I have discovered that the reason for the spoiling of fruit by freezing is the rupturing of cells by the formation of large ice crystals when fruit is frozen in the usual manner, that is, by temperatures ranging between 0° and —18° centigrade (—32° and 0° Fahrenheit), and that if fruit be frozen by exposure to a temperture of the order of —50° to —70° centigrade, the ice crystals which are formed in the fruit are exceedingly fine and do not result in the rupture of the cells of the fruit. For a short expression for the brief period of time referred to I have adopted the word "instantaneous" and it is to be understood that this term where found in the appended claims means any period under substantially twenty minutes.

By the use of the evaporation of solid carbon dioxide I am able to freeze comestibles within a time which may be considered instantaneous in comparison with former processes of freezing comestibles. For instance, sliced peaches may be frozen in substantially one and one-half minutes and other fruits in corresponding times, depending to some extent upon the sizes of the units, the entire time required even with large pieces being not more than twenty minutes. When frozen by my process, material may be placed in containers of any character and stored under ordinary refrigerating conditions at temperatures below the freezing point, not necessarily at the extremely low temperatures which are used in the freezing thereof. When wanted for use the materials may be taken out and allowed to thaw under ordinary living room conditions and in the case of fruit will be found equal in quality to fresh fruit.

To carry out the process of the invention the apparatus shown in the drawing is provided. The apparatus of Figs. 1 to 3 comprise a pair of chambers 10, 11, which are shown as spaced apart to provide a freezing chamber 12 therebetween. The chamber 12 is shown as open at its two sides 13, 14 and closed at the remaining two sides as indicated at 15, Fig. 3. The exposed sides and edges of chambers 10 and 11 as well as the closures 15 of the freezing chamber 12 are shown as heat insulated by a layer of material 16. The sides 17, 18 of chambers 10, 11 are desirably made of some material which will readily conduct heat as for instance of copper.

To cool the chambers 10, 11 intensely, conduits 19, 20 are shown to conduct liquefied carbon dioxide and inject the same into the chambers to expand therein to substantially atmospheric temperature, whereby carbon dioxide in snow or solid form will be produced in the chambers, which solid evaporating by heat withdrawn from the material in chamber 12 will be turned into gas which escapes through conduits 21, 22. The conduits 21, 22 may lead to the intake 34 of a compressor 35, which compressor has its delivery side 36 connected to the conduits 19, 20, a condenser 37 being included in the connection. The condenser is shown as cooled by the cold gases passing to the inlet of the compressor. A water cooled condenser 38 may also be applied to the conduit leading from the delivery side 36 of the pump if necessary or desired, in an obvious manner.

To convey material into the chamber 12 and to remove the same therefrom after freezing, there is shown a tray comprising two sections 23, 24 hinged together as at 25.

Supposing the section 24 to be loaded with fruit in the chamber, in the time required for the freezing of this fruit, the section 23 may be loaded by dropping fruit thereon and quickly spreading the same, whereupon the section 23 is pushed into the chamber thereby causing the section 24 to emerge from the side 14 and by yielding of the hinge 25 the section 24 may be allowed to fall from horizontal to discharge its load. The sliding action is reversed each time a charge is frozen.

The form of the invention shown in Fig. 4 utilizes an endless conveyor 26 passing about rollers 27, 28 which may bear sprocket teeth coacting with perforations in the belt 26 or chains carried by the belt 26.

The belt 26 should be of material which is a ready conductor of heat and is shown as provided with flights 29 between which the fruit may be placed as by a spout 30.

A hopper 31 is indicated into which the frozen material may be discharged by the belt.

To cool the chambers 10', 11', the conduits 19', 20' are indicated as inlets and conduits 21', 22' as outlets.

To seal the openings in the chambers 12, and 12', there are shown flexible flaps as of felt, canvas, or the like at 32, 33, 32', 33'.

In an obvious manner the apparatus may be arranged to pass fruit through the freezing chamber by force of gravity, the angle of fall being adjusted in accordance with the required time of passage of material through the chamber. To this end the chambers may be pivoted about a horizontal axis and threaded or cam means provided to adjust the angle from the horizontal.

Fig. 5 shows a modified form of apparatus wherein the freezing chamber is surrounded on two edges as well as two sides by the refrigerating space.

While the freezing chamber is shown open at opposite edges for introduction and removal of material, it will be obvious that only one edge need be open for this purpose.

Minor changes may be made in the physical embodiment of the apparatus without departing from the spirit of the invention within the scope of the appended claims.

I claim:

1. Apparatus for freezing material comprising, in combination, a closed freezing chamber having an opening, conveying means for passing material to be frozen into and out of said chamber through said opening, means to enclose a refrigerating space in direct heat exchanging relation with a wall of said chamber, means to form and continuously renew a supply of carbon dioxide snow in said space to freeze material carried into and out of said chamber by said conveying means.

2. Apparatus for freezing material comprising, in combination, a freezing chamber having an opening, conveying means for passing material to be frozen into and out of said chamber, means to substantially surround said chamber with a single closed refrigerating space in direct heat exchanging relation to the walls of said chamber, means to form and continuously renew a supply of carbon dioxide snow in said space to freeze material carried into and out of said chamber by said conveying means.

3. Apparatus for freezing material comprising, in combination, a material freezing chamber open at opposite edges, an enclosed refrigerant space at the top, bottom and sides of said chamber to substantially surround said chamber, means to form and continuously renew a supply of carbon dioxide snow in said space in direct heat exchanging relation to the walls of said chamber, a tray comprising sections hinged together, each section substantially equal in length to the interior of said chamber, said tray slidable in said chamber through said open edges whereby to simultaneously introduce a charge of material into and remove a frozen charge of material from said chamber, and to discharge the frozen material by gravity from a lowered section of the tray.

4. Apparatus for freezing material comprising, in combination, a material freezing chamber open at opposite edges, an endless conveyor, one stretch thereof mounted to travel through said chamber to convey material to be frozen through said chamber, means to substantially surround said chamber at top, bottom and sides by enclosed refrigerant receiving space, means to form and continuously renew a supply of carbon dioxide snow in said space in direct heat exchanging relation to the walls of said chamber, means to provide ready exit of gas from said space whereby to maintain the same at substantially atmospheric pressure whereby to quickly freeze material conducted by said conveyor.

WILLIAM T. COMER.